(12) United States Patent
Francoeur

(10) Patent No.: US 8,100,089 B1
(45) Date of Patent: Jan. 24, 2012

(54) SELF-CLEANING ANIMAL BRUSH APPARATUS

(76) Inventor: Kim T. Francoeur, Adrian, MI (US)

( * ) Notice: Subject to any disclaimer, the term of this patent is extended or adjusted under 35 U.S.C. 154(b) by 316 days.

(21) Appl. No.: 12/481,493

(22) Filed: Jun. 9, 2009

(51) Int. Cl.
*A01K 13/00* (2006.01)

(52) U.S. Cl. ......... 119/629; 119/600; 119/625; 132/119

(58) Field of Classification Search .................. 119/600, 119/618, 619, 625, 628, 601, 612, 615, 630, 119/664, 652, 629; D30/158, 159; 15/169; 132/119, 154
See application file for complete search history.

(56) References Cited

U.S. PATENT DOCUMENTS

| 1,185,876 A | 6/1916 | Colgan |
| 4,137,596 A | 2/1979 | Carlson et al. |
| 4,202,361 A | 5/1980 | Bills |
| D284,121 S | 6/1986 | Kelly |
| 6,427,633 B1 | 8/2002 | Ogden |
| 2007/0180638 A1 | 8/2007 | McKay |

*Primary Examiner* — Rob Swiatek
*Assistant Examiner* — Kathryn L Thompson

(57) ABSTRACT

The self-cleaning animal brush apparatus provides a one-piece flexible frame with flex hinge whereby straightening a user's hand causes the bristles to extend outwardly from the frame bottom. Cupping a user's hand causes the bristles to retract, automatically removing hair and debris from the bristles. A plurality of straps removably holds the apparatus to a user's hand.

6 Claims, 5 Drawing Sheets

SELF-CLEANING ANIMAL BRUSH APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Several problems are present in existing animal brushes. First, removal of hair and other objects requires a second hand and often a second tool. Another problem is bristle stiffness, which is often inadequate. And, bristle angle is a problem, with straight bristles often failing to reach skin and assist in flea and flea egg removal, for example. Also, some bristles are too short, while others are too long. Existing brushes that allow bristle length adjustment do not automatically do so. It is often further undesirable to have to lock the bristles in an extended position, as any variation needed requires further manual adjustment, if available at all. Additionally, having to grasp a brush is often tiring if not simply difficult, and few brushes are truly designed to properly conform to a user's hand. Another problem exists with brushes that require a user to pull or push in brushing the animal, instead of using the age-old most natural lateral hand movements. The present apparatus successfully addresses all of these concerns.

FIELD OF THE INVENTION

The self-cleaning animal brush apparatus relates to animal brushes, and more especially to a self-cleaning animal brush that extends and retracts bristles with a user straightening and cupping of the hand.

SUMMARY OF THE INVENTION

The general purpose of the self-cleaning animal brush apparatus, described subsequently in greater detail, is to provide a self-cleaning animal brush apparatus which has many novel features that result in an improved self-cleaning animal brush apparatus which is not anticipated, rendered obvious, suggested, or even implied by prior art, either alone or in combination thereof.

To attain this, the self-cleaning animal brush apparatus grooms an animal more completely than can conventional brushes. While various bristles are provided, the claw-shaped bristles, hereinafter referred to as claws, are the ideal embodiment. The claws also more completely reach an animal's skin than do previously provided bristles, and further provide removal of fleas and flea eggs more effectively. The bristles are available in more than one embodiment, from totally rigid to relatively stiff. Removal of burrs, clots, briars, and other debris is affected more completely with stiff bristles and even more so with the claws. The apparatus self-cleans when the bristles are retracted by virtue of the bristles' proximal tolerance fit within the elongated orifices of the bottom section of the bottom. Various bristle embodiments are provided with respect to the number and location of bristles and of corresponding elongated orifices. The ideal embodiment provides three rows of bristles, with four bristles, five bristles, and four bristles alternately spaced apart, respectively. Straightening a user's hand extends the bristles. Cupping a user's hand retracts the bristles. Any hand position between the two allows a user to determine the extent of bristle extension and retraction. The self-cleaning animal brush apparatus provides removable self-retention on a user's hand by the straps. The ideal embodiment proves the backhand strap, along with the thumb strap, lateral strap, and finger strap, although more basic embodiments with fewer straps are provided. The backhand strap affords the adjustment needed to fit various sizes of hands. The self-cleaning animal brush apparatus is provided in both left and right hand embodiments.

While the self-hinging frame is ideally provided with a circle formed by the flat section and distal extension, along with a matching circular bottom section, other shapes are also provided.

Thus has been broadly outlined the more important features of the improved self-cleaning animal brush apparatus so that the detailed description thereof that follows may be better understood and in order that the present contribution to the art may be better appreciated.

An object of the self-cleaning animal brush apparatus is to self-clean the bristles and apparatus of hair and other debris.

An object of the self-cleaning animal brush apparatus is to more effectively groom an animal.

Another object of the self-cleaning animal brush apparatus is removable self-retention on a user's hand.

A further object of the self-cleaning animal brush apparatus is to provide both left and right hand embodiments.

An added object of the self-cleaning animal brush apparatus is to provide extendable and retractable bristles requiring only a straightening or cupping of a user's hand.

And, an object of the self-cleaning animal brush apparatus is to optionally provide claw-shaped bristles.

Yet another object of the self-cleaning animal brush apparatus is to provide user-selective bristle extension amount with only a slight change in hand cupping and straightening.

These together with additional objects, features and advantages of the improved self-cleaning animal brush apparatus will be readily apparent to those of ordinary skill in the art upon reading the following detailed description of presently preferred, but nonetheless illustrative, embodiments of the improved self-cleaning animal brush apparatus when taken in conjunction with the accompanying drawings.

In this respect, before explaining the current embodiments of the improved self-cleaning animal brush apparatus in detail, it is to be understood that the self-cleaning animal brush apparatus is not limited in its application to the details of construction and arrangements of the components set forth in the following description or illustration.

Those skilled in the art will appreciate that the concept of this disclosure may be readily utilized as a basis for the design of other structures, methods, and systems for carrying out the several purposes of the improved self-cleaning animal brush apparatus. It is therefore important that the claims be regarded as including such equivalent constructions insofar as they do not depart from the spirit and scope of the self-cleaning animal brush apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 4 thereof, the principles and concepts of the self-cleaning animal brush apparatus generally designated by the reference number 10 will be described.

Figure 1:
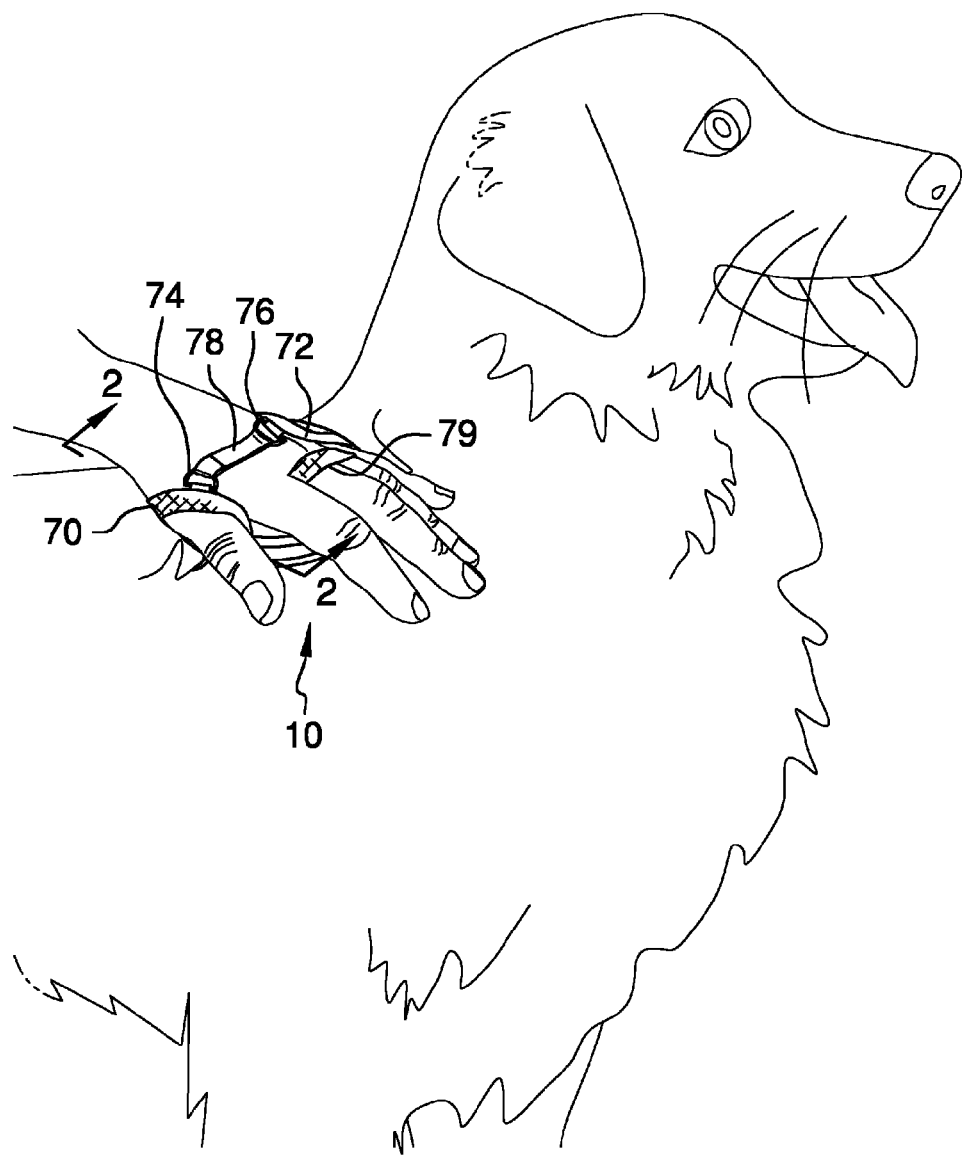
FIG. 1 is a perspective view of the apparatus in use.
Figure 2:
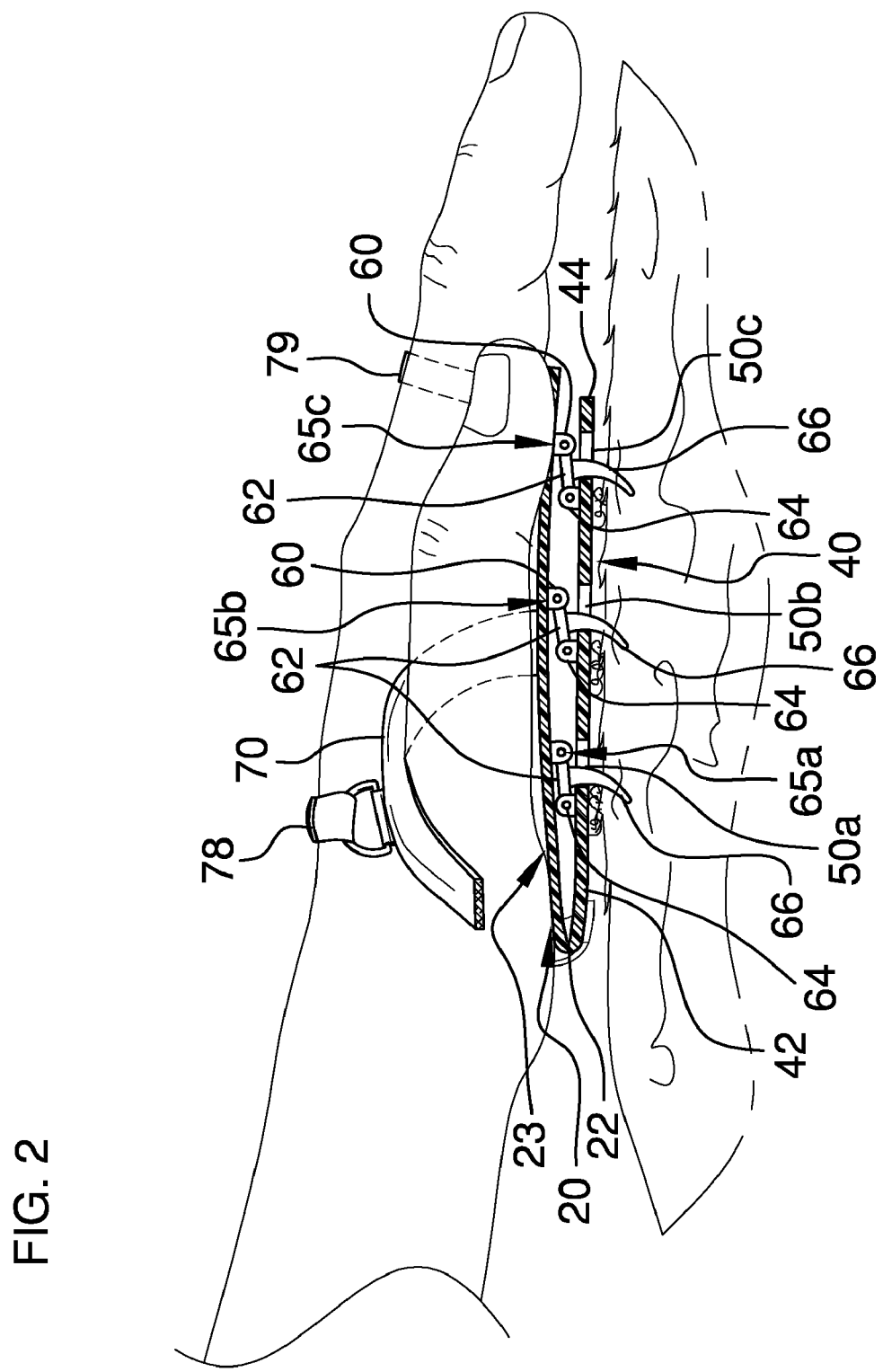
FIG. 2 is a lateral partial cross sectional view of FIG. 1, taken along the line 2-2, with the user's hand slightly straightened, the bristles not yet fully extended.
Figure 2A:
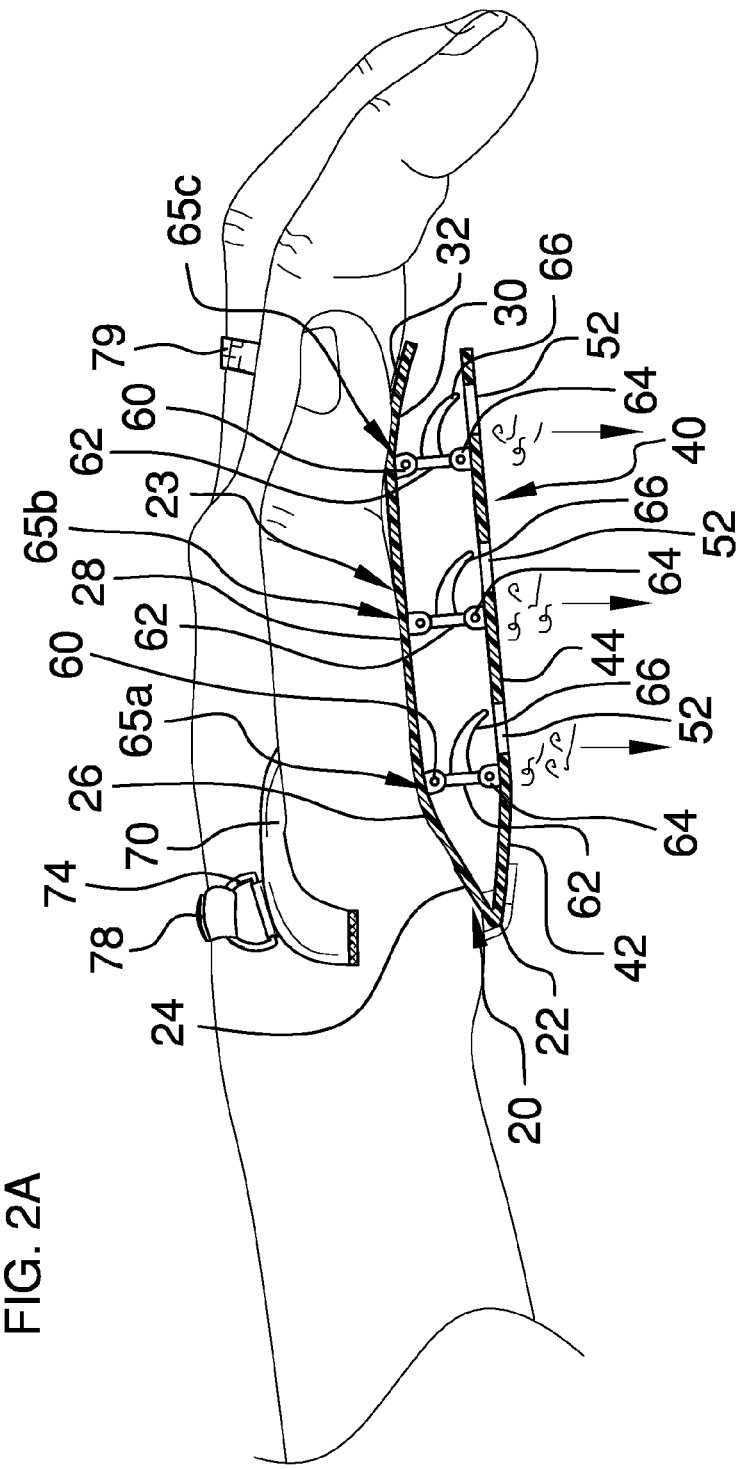
FIG. 2A is a lateral partial cross sectional view of FIG. 1, taken along the line 2-2, with the user's hand cupped and bristles fully retracted.
Figure 4:
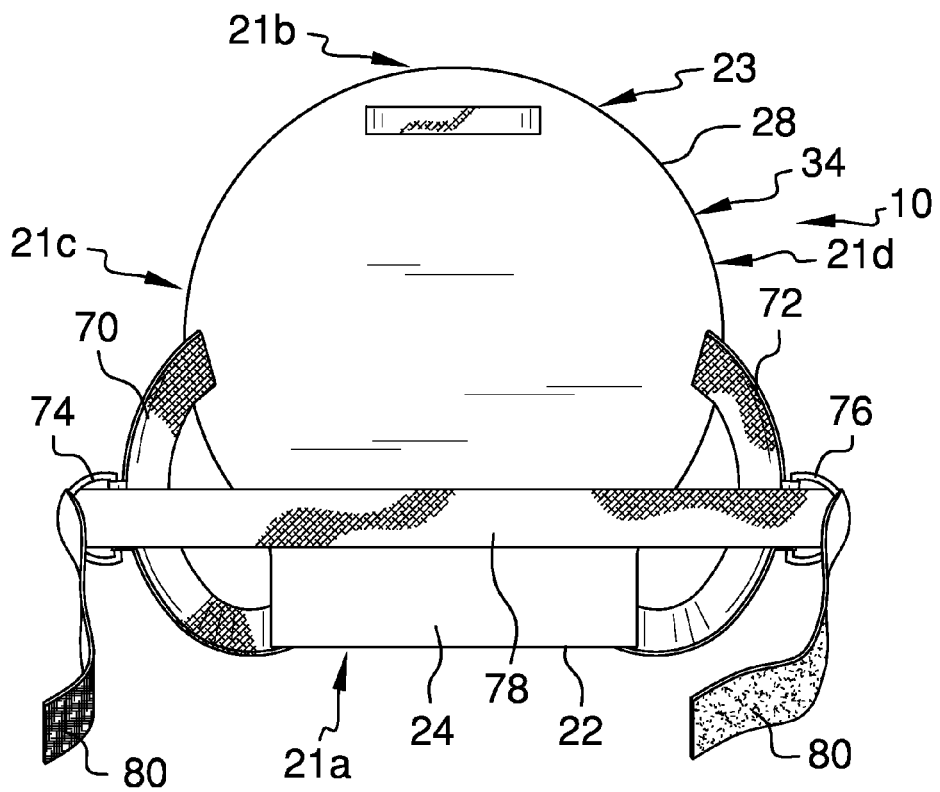
FIG. 4 is a top plan view.

Referring to FIGS. 2A and 4, the apparatus 10 partially comprises the flexible self-hinging frame 20 having a top 23 substantially parallel to a bottom 40. The top 23 is joined to the bottom 40 by the flex hinge 22. The frame 20 has a proximal end 21a spaced apart from a distal end 21b and a medial side 21c spaced apart from a lateral side 21d. The top 23 further comprises the rectangular proximal extension 24 seamlessly extended from the flex hinge 22. The semicircular flat section 28 is seamlessly extended from the proximal extension 24 at the first bend 26. The second bend 30 terminates the flat section 28 proximal to the distal end 21b. The distal extension 32 seamlessly extends from the second bend 30. The distal extension 32 terminates a circle 34 formed by the flat section 28 and the distal extension 32.

Figure 5:
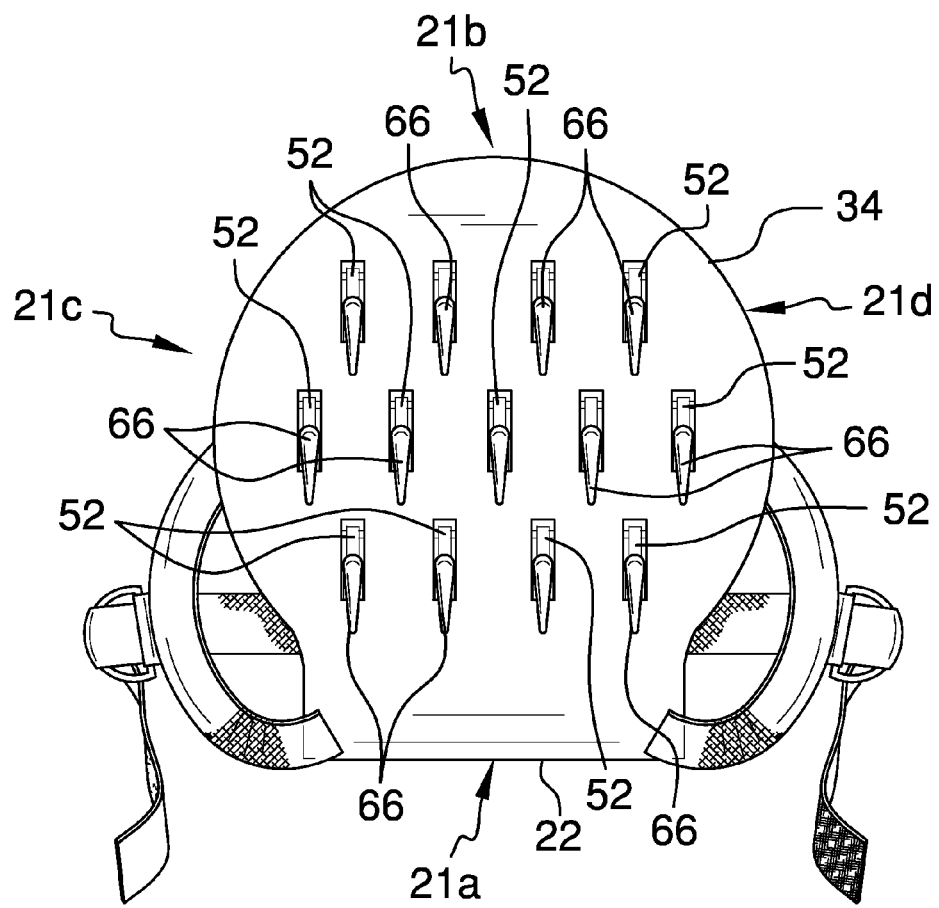
FIG. 5 is a bottom plan view, claws extended.

Referring to FIGS. 2, 2A, and 5, the trio of spaced apart pivot rows comprises the first pivot row 65a most proximal to the proximal extension 24, the second pivot row 65b disposed distally from the first pivot row 65a, and the third pivot row 65c disposed distally from the second pivot row 65b. A plurality of spaced apart top pivots 60 is disposed in each pivot row. The bottom 40 further comprises the rectangular bottom extension 42 seamlessly extended from the flex hinge 22.

The substantially flat circular bottom section 44 seamlessly extends from the bottom extension 42. The trio of spaced apart orifice rows is disposed within the circular bottom section 44. Each orifice row has a plurality of elongated orifices 52. The orifice rows comprise the proximal orifice row 50a disposed proximal to the rectangular bottom extension 42, the center orifice row 50b disposed distally from the proximal orifice row 50a, and the distal orifice row 50c disposed distally from the center orifice row 50b. The bottom section 44 further comprises the plurality of spaced apart bottom pivots 64. One bottom pivot 64 is disposed immediately proximal to one of each of the elongated orifices 52. An arm 62 pivotally connects one of each of the top pivots 60 to one of each of the bottom pivots 64. A curved bristle 66 is disposed on each arm 62. It has been experimentally determined that the ideal embodiment provides a quartet of top pivots in the first pivot row, a quintet of pivots in the second pivot row 65b, and a quartet of pivots in the third pivot row 65c.

Figure 3:
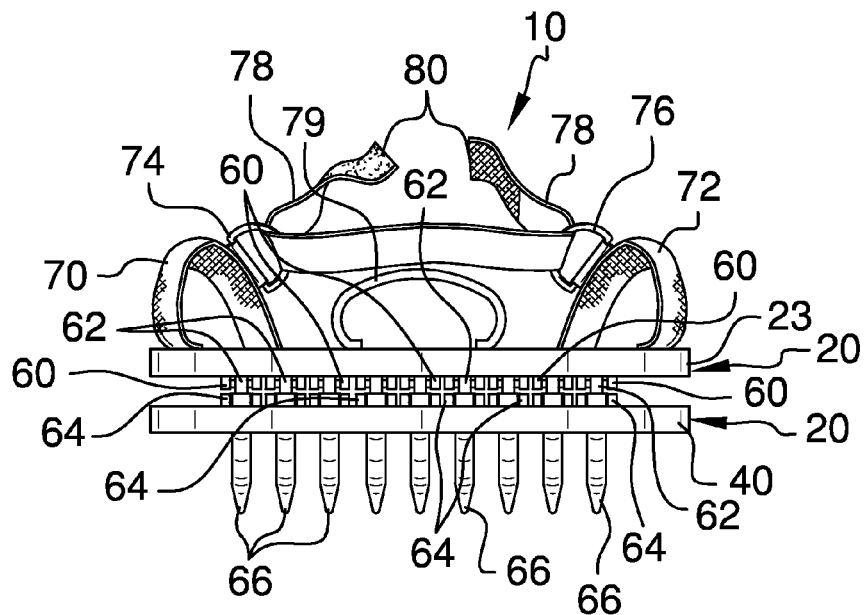
FIG. 3 is a frontal view of the apparatus, claws extended.

Referring to FIGS. 2, 2A, and 3, straightening of a user's hand causes the top 23 and the bottom 40 to be disposed in a parallel condition. A less than totally straight hand causes a slightly less than parallel condition. As the top 23 and bottom 40 more and more closely approach a fully parallel condition, the bristles 66 are progressively more extended through each elongated orifice 52. Cupping of the hand causes a retreat of each bristle 66 from each elongated orifice 52.

Referring now to FIG. 1 and also, again, to FIGS. 3 and 4, the thumb strap 70 is connected to the top 23 medial side 21c flat section 28 and to the bottom 40 medial side 21c bottom extension 42.

The first d-ring 74 is connected to the thumb strap 70. The lateral strap 72 is connected to the top 23 lateral side 21d flat section 28 and to the bottom 40 lateral side 21d bottom extension 42. The second d-ring 76 is connected to the lateral strap 72. The backhand strap 78 is looped through the first d-ring 74 and the second d-ring 76. The backhand strap 78 is removably connected via hook and loop 80. The finger strap 79 is connected to the top 23 distal extension 32. The apparatus 10 is thereby removably self-secured to a user's hand, negating any grip requirements. Lateral hand motion grooms the animal. The relaxation of a straight hand, or cupping of the hand, whichever term is applied, causes the claws 66 to retract within the elongated orifices 52 automatically extracting any hair or other debris from the bristles 66, shedding the material off of the bottom 40.

The apparatus, as claimed, provides the unexpected and unpredictable benefit of hand grooming to an animal. As part of a user's hand touches the animal, the animal experiences more comfort and enjoyment. This further transfers into more pleasure each time an animal is stroked, whether with or without the apparatus. This unexpected result is not immediately rendered obvious to one skilled in the art.

With respect to the above description then, it is to be realized that the optimum dimensional relationships for the parts of the self-cleaning animal brush apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the self-cleaning animal brush apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the self-cleaning animal brush apparatus may be used.

Therefore, the foregoing is considered as illustrative only of the principles of the self-cleaning animal brush apparatus. Further, since numerous modifications and changes will readily occur to those skilled in the art, it is not desired to limit the self-cleaning animal brush apparatus to the exact construction and operation shown and described, and accordingly, all suitable modifications and equivalents may be resorted to, falling within the scope of the self-cleaning animal brush apparatus.

What is claimed is:

1. A self-cleaning animal brush apparatus, comprising:
    a flexible self-hinging frame having a top substantially parallel to a bottom, the top joined to the bottom by a flex hinge, the frame having a proximal end spaced apart from a distal end, a medial side spaced apart from a lateral side, the top further comprising:
        a rectangular proximal extension seamlessly extended from the flex hinge,
        a flat section seamlessly extended from the proximal extension at a first bend;
        a second bend terminating the flat section proximal to the distal end;
        a distal extension seamlessly extended from the second bend;
        a trio of spaced apart pivot rows comprising a first pivot row most proximal to the proximal extension, a second pivot row disposed distally from the first pivot row, a third pivot row disposed distally from the second pivot row;

a plurality of spaced apart top pivots disposed in each pivot row;

the bottom further comprising:

a rectangular bottom extension seamlessly extended from the flex hinge;

a substantially flat bottom section seamlessly extended from the bottom extension;

a trio of spaced apart orifice rows disposed within the bottom section, each orifice row having a plurality of elongated orifices, each orifice corresponding to one of each of the top pivots, the orifice rows comprising a proximal orifice row disposed proximal to the rectangular bottom extension, a center orifice row disposed distally from the proximal orifice row, a distal orifice row disposed distally from the center orifice row;

a plurality of spaced apart bottom pivots, one bottom pivot disposed immediately and proximally to one of each of the elongated orifices, one bottom pivot disposed below one of each of the top pivots;

an arm pivotally connecting one of each of the top pivots to one of each of the bottom pivots;

a bristle disposed on each arm.

2. The apparatus according to claim 1 wherein the first pivot row further comprises a quartet of pivots;

the second pivot row further comprises a quintet of pivots;

the third pivot row further comprises a quartet of pivots.

3. A self-cleaning animal brush apparatus, comprising:

a flexible self-hinging frame having a top substantially parallel to a bottom, the top joined to the bottom by a flex hinge, the frame having a proximal end spaced apart from a distal end, a medial side spaced apart from a lateral side, the top further comprising:

a rectangular proximal extension seamlessly extended from the flex hinge, a semicircular flat section seamlessly extended from the proximal extension at a first bend;

a second bend terminating the flat section proximal to the distal end;

a distal extension seamlessly extended from the second bend, the distal extension terminating a circle formed by the flat section and the distal extension;

a trio of spaced apart pivot rows comprising a first pivot row most proximal to the proximal extension, a second pivot row disposed distally from the first pivot row, a third pivot row disposed distally from the second pivot row;

a plurality of spaced apart top pivots disposed in each pivot row;

the bottom further comprising:

a rectangular bottom extension seamlessly extended from the flex hinge;

a substantially flat circular bottom section seamlessly extended from the bottom extension;

a trio of spaced apart orifice rows disposed within the bottom section, each orifice row having a plurality of elongated orifices, one of each orifice corresponding to one of each of the top pivots, the orifice rows comprising a proximal orifice row disposed proximal to the rectangular bottom extension, a center orifice row disposed distally from the proximal orifice row, a distal orifice row disposed distally from the center orifice row;

a plurality of spaced apart bottom pivots, one bottom pivot disposed immediately and proximally to one of each of the elongated orifices, one bottom pivot disposed below one of each of the top pivots;

an arm pivotally connecting one of each of the top pivots to one of each of the bottom pivots;

a bristle disposed on each arm.

4. The apparatus according to claim 3 wherein the first pivot row further comprises a quartet of pivots;

the second pivot row further comprises a quintet of pivots;

the third pivot row further comprises a quartet of pivots.

5. A self-cleaning animal brush apparatus, comprising:

a flexible self-hinging frame having a top substantially parallel to a bottom, the top joined to the bottom by a flex hinge, the frame having a proximal end spaced apart from a distal end, a medial side spaced apart from a lateral side, the top further comprising:

a rectangular proximal extension seamlessly extended from the flex hinge, a semicircular flat section seamlessly extended from the proximal extension at a first bend;

a second bend terminating the flat section proximal to the distal end;

a distal extension seamlessly extended from the second bend, the distal extension terminating a circle formed by the flat section and the distal extension;

a trio of spaced apart pivot rows comprising a first pivot row most proximal to the proximal extension, a second pivot row disposed distally from the first pivot row, a third pivot row disposed distally from the second pivot row;

a plurality of spaced apart top pivots disposed in each pivot row;

the bottom further comprising:

a rectangular bottom extension seamlessly extended from the flex hinge;

a substantially flat circular bottom section seamlessly extended from the bottom extension;

a trio of spaced apart orifice rows disposed within the flat circular bottom section, each orifice row having a plurality of elongated orifices, one of each orifice corresponding to one of each of the top pivots, the orifice rows comprising a proximal orifice row disposed proximal to the rectangular bottom extension, a center orifice row disposed distally from the proximal orifice row, a distal orifice row disposed distally from the center orifice row;

a plurality of spaced apart bottom pivots, one bottom pivot disposed immediately and proximally to one of each of the elongated orifices, one bottom pivot disposed below one of each of the top pivots;

an arm pivotally connecting one of each of the top pivots to one of each of the bottom pivots;

a curved bristle disposed on each arm;

a thumb strap connected to a top medial side flat section and to a bottom medial side bottom extension;

a first d-ring connected to the thumb strap;

a lateral strap connected to a top lateral side flat section and to a bottom lateral side bottom extension;

a second d-ring connected to the lateral strap;

a backhand strap looped through the first d-ring and the second d-ring, the backhand strap removably connected via hook and loop;

a finger strap connected to the top distal extension.

6. The apparatus according to claim 5 wherein the first pivot row further comprises a quartet of pivots;

the second pivot row further comprises a quintet of pivots;

the third pivot row further comprises a quartet of pivots.

* * * * *